(12) United States Patent
Kouchi et al.

(10) Patent No.: US 7,380,996 B2
(45) Date of Patent: Jun. 3, 2008

(54) CAMERA PLATFORM

(75) Inventors: Takamitsu Kouchi, Kadoma (JP); Kazumi Teratani, Hirakata (JP); Hisao Kobayashi, Ibaraki (JP); Keiichi Teranishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 257 days.

(21) Appl. No.: 11/281,560

(22) Filed: Nov. 18, 2005

(65) Prior Publication Data

US 2006/0110155 A1 May 25, 2006

(30) Foreign Application Priority Data

Nov. 19, 2004 (JP) ............................. 2004-336530

(51) Int. Cl.
*G03B 17/00* (2006.01)
*H04N 5/225* (2006.01)
*H04N 7/18* (2006.01)
*A47F 5/00* (2006.01)
*B42F 13/00* (2006.01)

(52) U.S. Cl. ..................... 396/424; 396/428; 348/148; 348/373; 248/288.31; 248/343

(58) Field of Classification Search ................ 396/419, 396/421, 422, 424, 427, 428; 348/143, 148, 348/373–376; 248/663, 430, 181.1, 181.2, 248/288.31, 200, 237, 222.51, 224.7, 222.14, 248/343

See application file for complete search history.

(56) References Cited

U.S. PATENT DOCUMENTS 2,375,214 A * 5/1945 Creedon ..................... 248/126

FOREIGN PATENT DOCUMENTS

JP 10288811 A 10/1998

\* cited by examiner

*Primary Examiner*—Rochelle-Ann Blackman
(74) *Attorney, Agent, or Firm*—Steptoe & Johnson LLP

(57) ABSTRACT

A camera platform for installing a camera in the inside of an automobile is designed in such a manner that even when a camera is rotated to capture rearward images, the camera does not interfere with a room mirror. Since the shaft of a rotation portion is divided into a rotation shaft and a ball shaft, an arm part of the camera platform is rotated without the necessity of rotating the camera main body in the vicinity of the room mirror, so that it becomes possible to carry out rearward image capturing operations. Moreover, since the rotation shaft of the arm part is designed to be offset from the camera attaching center line by 20 mm, it becomes possible to prevent a cable extending from above the camera from contacting with an arm attachment part of a mount, even when the camera is rotated.

6 Claims, 4 Drawing Sheets

CAMERA PLATFORM

CLAIM OF PRIORITY

This application claims priority under 35 USC 119 to Japanese Patent Application No. 2004-336530, filed on Nov. 19, 2004, the entire contents of which is hereby incorporated by reference.

BACKGROUND OF THE INVENTION

1. Field of the Invention

The present invention relates to a camera platform for attaching a camera to a vehicle and the like.

2. Description of the Related Art

A camera platform includes a mount base on which a camera platform is attached, which is located at an upper end of a tripod or the like, and a rotatable shaft to which a camera is rotatably attached (for example, see JP10-288811 B).

FIG. 5 is a sectional view that shows a configuration of a conventional camera platform. A ball shaft 21 is attached to a lower end of a camera base 20 on which a camera is mounted. This ball shaft 21 and a mount base 22 to which a tripod or the like is attached are placed in association with each other, and the ball shaft 21 and the mount base 22 are sandwiched by a cylindrical case main body 23 that can be divided into two portions, so that the divided portions of the case main body 23 are tightened and secured with each other in the horizontal direction by a tightening mechanism 24. Although the ball shaft 21 is sandwiched in the case main body 23, the spherical portion thereof is allowed to slide so that the camera base 20 attached to the ball shaft 21 can be rotated at a predetermined angle.

In the case where a camera is attached to an automobile by using a conventional camera platform, as shown in FIG. 6, the camera platform shown in FIG. 5 is held upside down, and a video camera 25 is attached to the camera base 20, with a platform securing member 26 having a plate shape being attached to the mount base 22, so that the rear end of the platform securing member 26 is attached to a ceiling portion, a room mirror or the like.

In the aforementioned conventional configuration, however, when the video camera 25 is rotated centered on the center axis of the mount base 22 or the ball shaft 21, an obstacle such as a room mirror is sometimes located on the rotation orbit of the video camera 25, with the result that it is difficult to carry out an operation such as directing the video camera 25 facing the front side to face the rear side by rotating it by 180 degrees. In such a case, a video camera that has such a small size that it does not come into contact with the obstacle even upon rotation needs to be used, or the video camera 25 can not be directed to face the rear side unless the obstacle is shifted.

Moreover, in the case where a video camera of a type that a cable (not shown) is extended from above the case main body 23 of the video camera 25 is attached, a problem arises in which upon rotation of the video camera 25, the cable comes into contact with the platform securing member 26.

SUMMARY OF THE INVENTION

In view of the aforementioned problems, an object of the present invention is to provide a camera platform which can rotate a camera without making it in contact with a platform securing member, a room mirror and the like.

In order to solve the aforementioned conventional problems, a camera platform according to the present invention includes an arm part for rotating a camera, an attachment member for attaching the arm part to an attachment target such as an automobile, a rotation part for rotatably attaching one end of the arm part to the attachment member, and a ball shaft attached to the other end of the arm part to adjust the direction of the camera.

The camera platform according to the present invention adopts a configuration that the shaft of the rotation portion is divided into a rotation shaft and a ball shaft so that, to allow rearward image capturing operations, the arm part of the camera plat form is rotated without the necessity of rotating the camera main body in the vicinity of a room mirror. Moreover, by adopting a configuration that the rotation shaft of the arm part is offset from the attaching center axis of the camera, it becomes possible to prevent a cable that extends from above the camera from coming into contact with the attachment member, when the camera is rotated.

DESCRIPTION OF THE PREFERRED EMBODIMENTS

Figure 1:
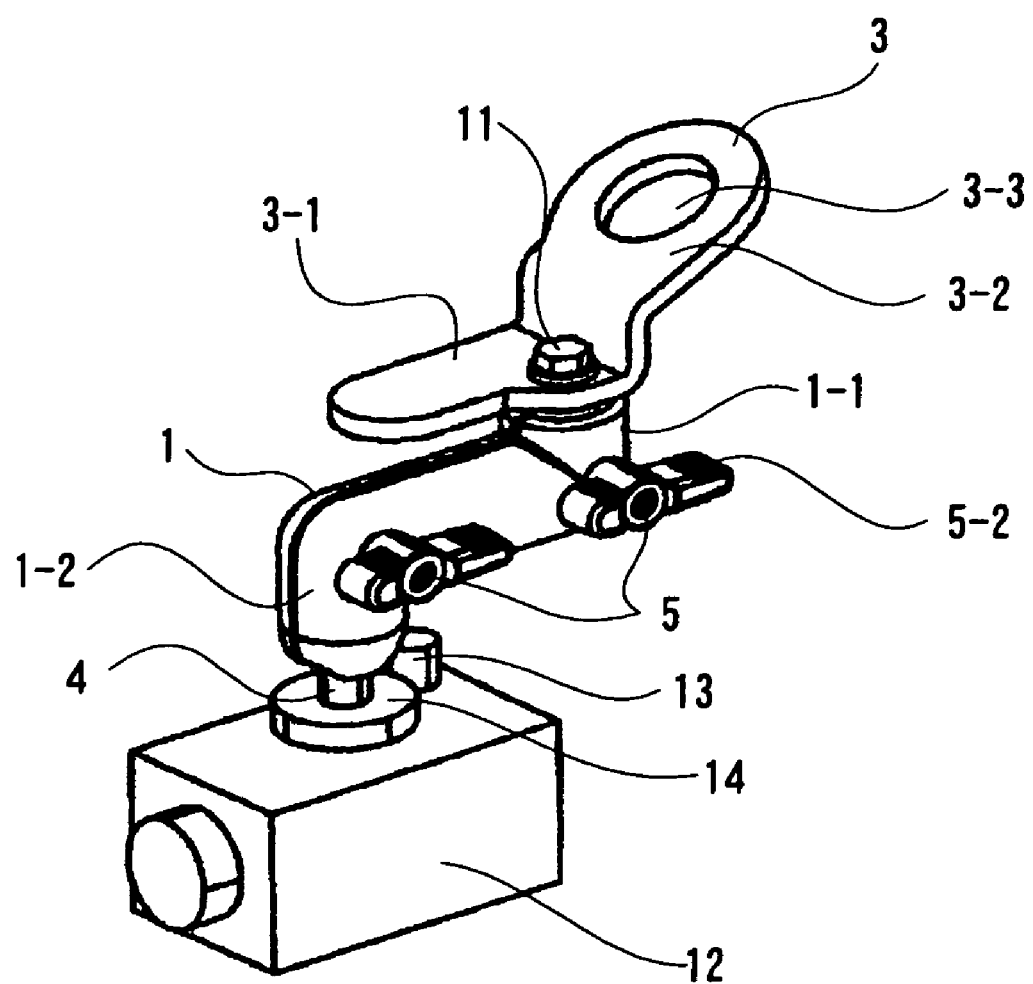
FIG. 1 is a structural view showing a camera platform according to an embodiment of the present invention.

Referring to the drawings, description will be given of embodiments of the present invention in detail. A camera platform according to this embodiment is used for securing a camera near an upper portion of the front glass inside an automobile.

Figure 2:
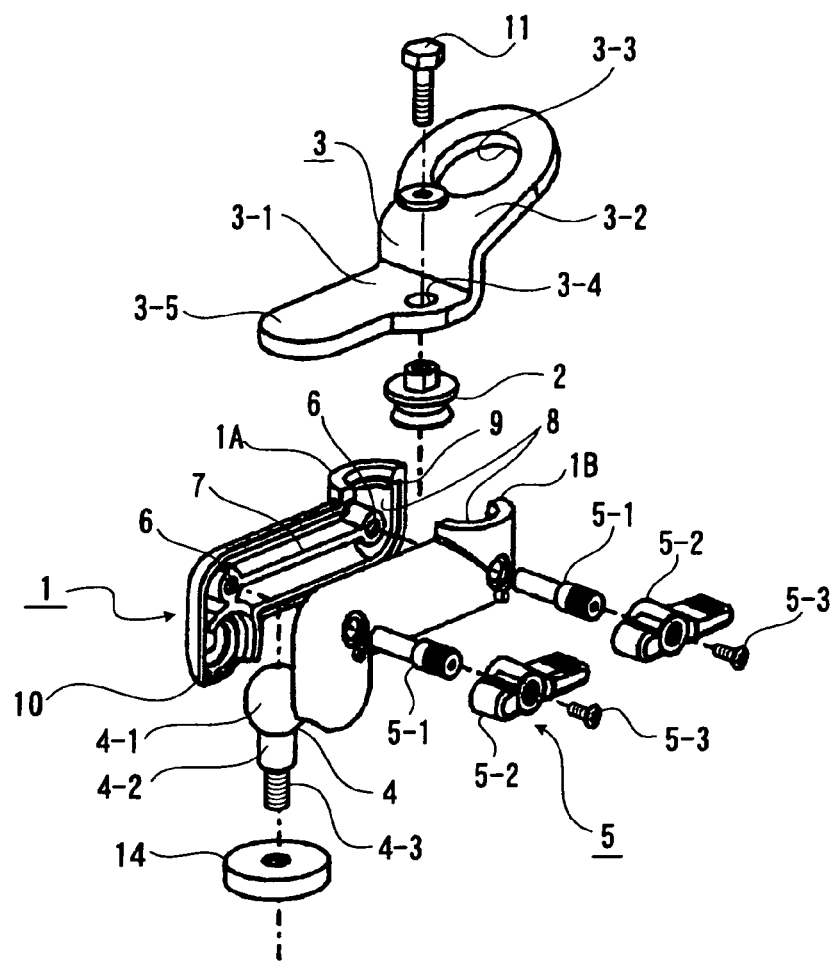
FIG. 2 is an exploded view of the camera platform according to the embodiment of the present invention.

FIG. 1 is a perspective view that shows the camera platform according to the present invention to which a camera is attached, and FIG. 2 is an exploded perspective view of the camera platform according to the embodiment of the present invention. In FIGS. 1 and 2, the camera platform according to the present invention has a crank shape in which a first end 1-1 of an arm part 1 is bent upward and a second end 1-2 is bent downward, and includes a rotation shaft (rotation part) 2 provided in the first end 1-1 of the arm part 1, an attachment member 3 for attaching the first end 1-1 of the arm part 1 to the ceiling of the automobile, a ball shaft 4 provided in a lower portion of the second end 1-2 of the arm part 1, and a tightening mechanism 5 for tightening the arm part 1.

The arm part 1 is hollow in its inside except for ribs and the like, and is constituted by a pair of right and left shells 1A and 1B that are laterally tightened and secured with each other by the tightening mechanism 5. Screw holes 6 to which shafts 5-1 of the tightening mechanism 5 are screwed are formed on two end portions of the inner wall of the shell 1A. A rib 7 is formed between the screw hole 6 and the screw hole 6 inside the shell 1A. Moreover, a groove 9 having a V shape in its cross section is formed on the inner circumference of an opening 8 of the first end 1-1 that is bent upward of the arm part 1, and the rotation shaft 2 that makes the arm part 1 rotatable is sandwiched in the V-shaped groove 9. A spherical hollow part 10 is formed in the second end 1-2 of the arm part 1 that is bent downward, and a spherical portion 4-1 of the ball shaft 4 is fitted into this hollow part 10.

Moreover, an attachment member 3 (hereinafter, referred to as mount 3) is secured to the rotation shaft 2 by a bolt 11 so as to attach the camera platform to the automobile. This mount 3, which is a flat plate bent in the center with an obtuse angle, is constituted by an arm attachment part 3-1 and a securing part 3-2. This arm attachment part 3-1 forms a main-body portion of the mount 3, which is made substantially horizontal when attached to the automobile, and the arm part 1 is attached to the arm attachment part 3-1 through the rotation shaft 2. The securing part 3-2 is a portion for securing the mount 3 to the ceiling of the automobile, and the securing part 3-2 extends diagonally upward, after having been once raised vertically from the rear edge of the arm attachment part 3-1. An attachment hole 3-3, for screw-securing the mount 3 onto the ceiling of the automobile, is provided in the securing part 3-2. Moreover, the screw hole 3-4 for attaching the arm attachment part 3-1 of the mount 3 to the rotation shaft 2 is subjected to a rotation-stopping treatment against the rotation shaft 2. The screw hole 3-4 is provided in the mount 3 in a manner so as to offset right or left from the center line in the front to rear direction of the mount 3. In this embodiment, in FIG. 2, supposing that the direction toward the second end 1-2 side of the arm part 1 is defined as an advancing direction, the screw hole 3-4 is offset toward the left side with respect to the advancing direction.

Figure 4:
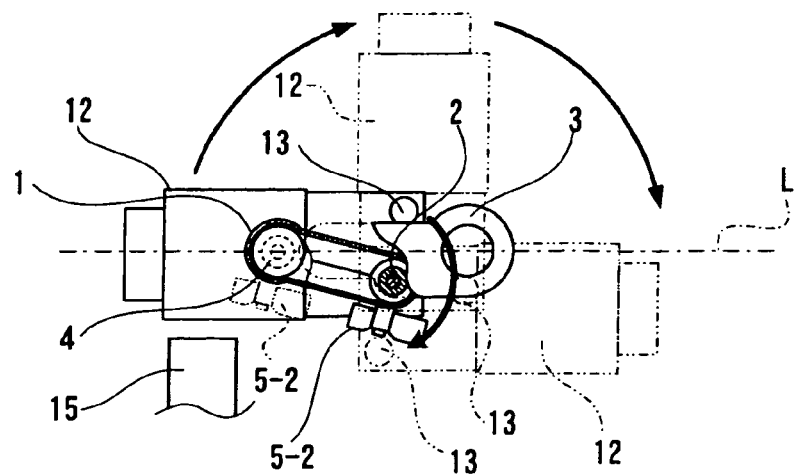
FIG. 4 illustrates a rotation range of the camera platform.
Figure 5:
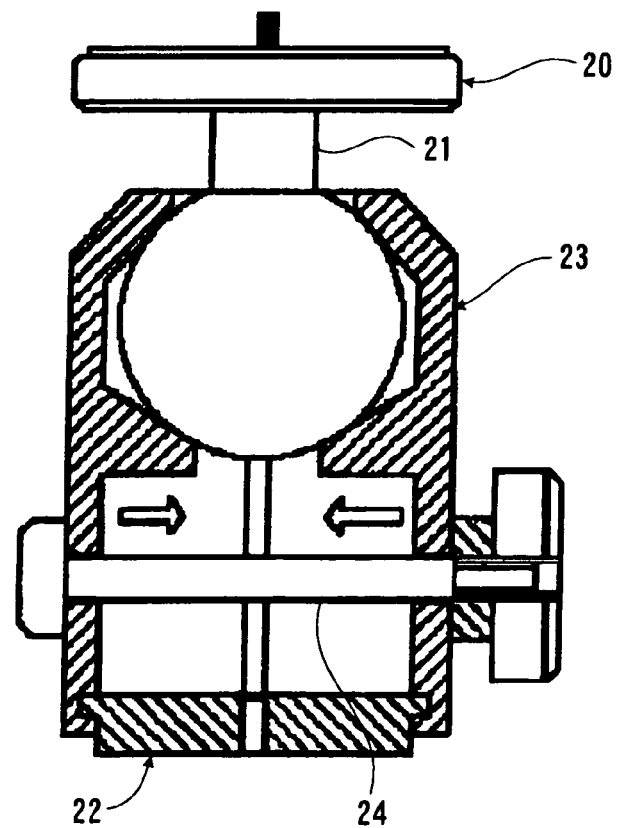
FIG. 5 is a structural view showing a conventional camera platform.
Figure 6:
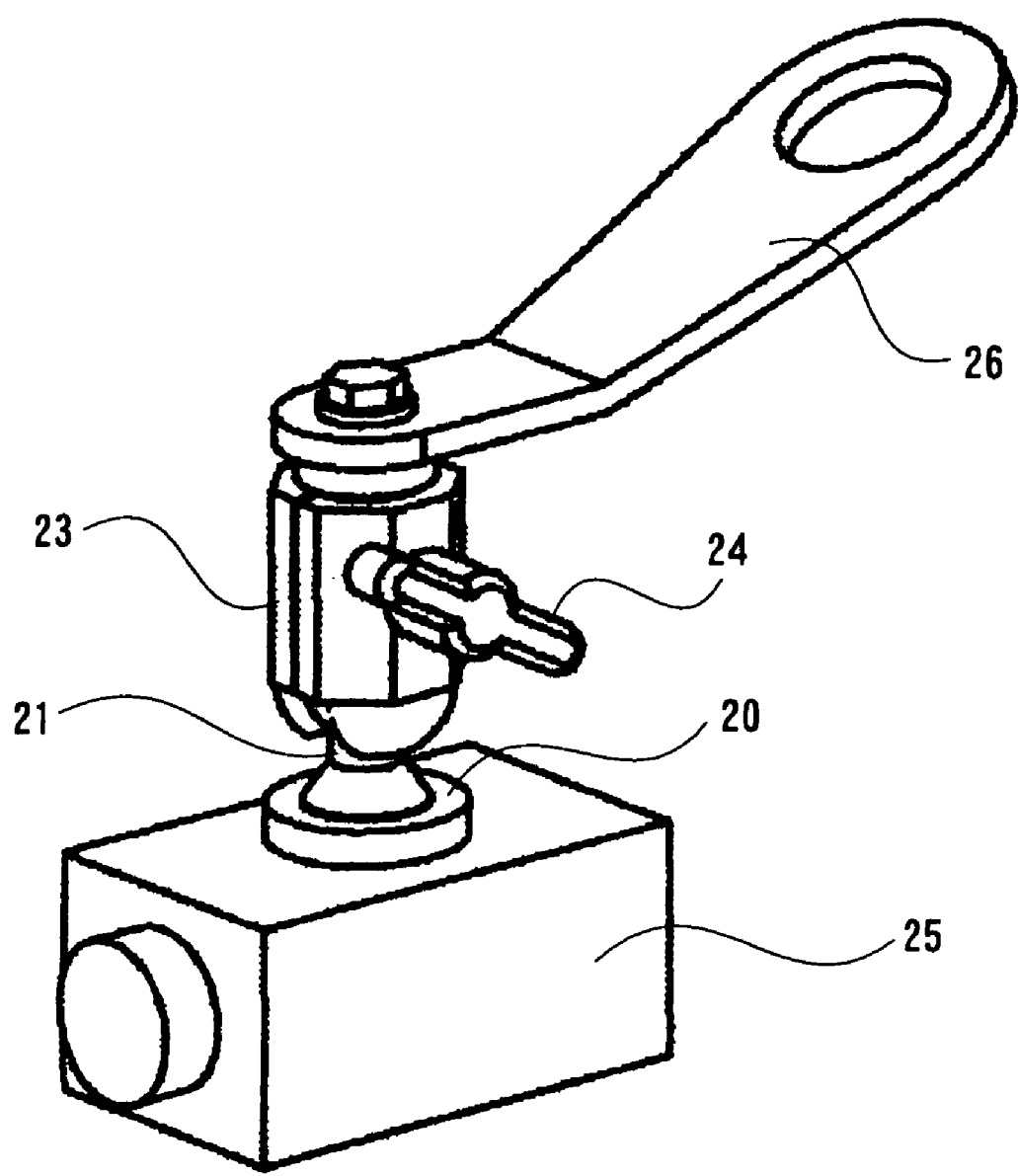
FIG. 6 is a structural view that showing a conventional camera platform for attaching a camera to a vehicle.

Here, the total length in the horizontal direction of the arm part 1 is set to such a length that a connector 13 for use in outputting images, which is attached with its face up to the rear end on the right side of the upper face of the camera 12, is not made in contact with the arm attachment part 3-1. In other words, as shown in FIG. 4, the total length of the arm part 1 is determined so that upon rotation of the camera 12, the connector 13 is positioned rearward from the arm attachment part 3-1, for example, below the securing part 3-3.

The ball shaft 4 has an integrated structure with the spherical portion 4-1 and the shaft portion 4-2, and the spherical portion 4-1 is pivotally housed in the second end 1-2 of the arm part 1. With this arrangement, in a state in which the tightening mechanism 5 has been slackened, the camera base 14 is freely rotatably maintained with respect to the arm part 1.

The camera base 14 having a disc shape in which a screw hole is formed in the center is attached to the shaft portion 4-2 of the ball shaft 4 so that the camera base 14 is positioned below the second end of the arm part 1. When the shaft portion 4-2 is completely fitted to the camera base 14, the lower end of the shaft portion 4-2 is allowed to stick out so that the camera 14 is secured to this sticking screw portion 4-3.

The tightening mechanism 5 is a threaded shaft constituted by a shaft 5-1 to be fitted to the screw hole 6 of the shell 1A, a butterfly nut 5-2 attached to the tip of the shaft 5-1 and a screw 5-3 that secures the butterfly nut 5-2 to the tip of the shaft 5-1. The pair of the right and left shells 1A and 1B of the arm part 1 are tightened with each other laterally by the tightening mechanism 5 so that the ball shaft 4 to which the camera base 14 is attached and the rotation shaft 2 are tightened and secured to the arm part 1.

The camera platform having the above-mentioned configuration is attached to an automobile by using a screw (not shown) at a hook portion of a sun visor provided in the vicinity of the room mirror 15. In this embodiment, the mount 3 is secured to the hook portion of the sun visor on the right side. In other words, the attachment hole 3-3 of the mount 3 and the hook portion of the sun visor are mutually tightened with the screw to be secured to each other. When the mount 3 is secured to the ceiling of the automobile, a mount front portion 3-5, which is the front portion of the arm attachment part 3-1, is pressed against the ceiling so that the mount 3 is secured to the ceiling firmly.

Figure 3:
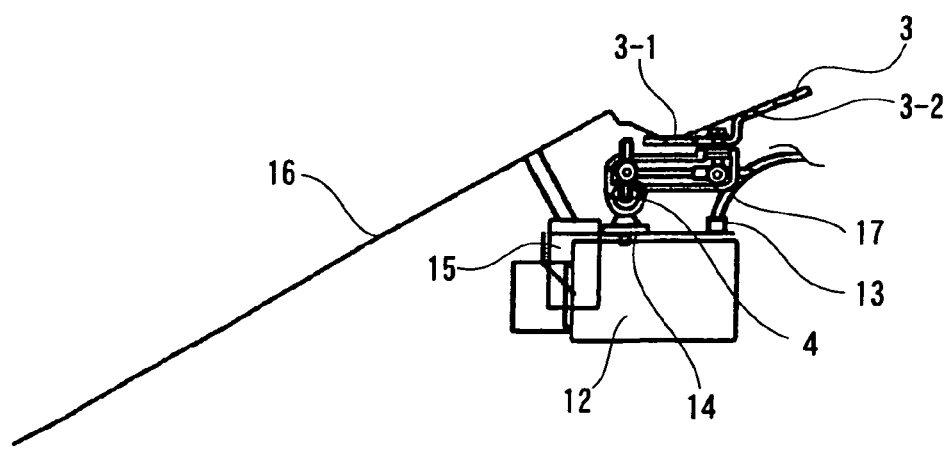
FIG. 3 shows a positional relationship between the camera platform and an automobile.

FIG. 3 shows a use state in which the positional relationship among the camera 12, the front window 16 and the room mirror 15 of the automobile is indicated in the embodiment of the present invention. A cable 17 is connected to the connector 13. The cable 17 extends rearward in an upward direction from the connector 13, and is placed along the ceiling with a margin that allows the camera 12 to rotate. The camera 12 is secured to the camera platform according to the present invention with the screw portion 4-3 that sticks from the camera base 14. As described above, the camera 12 is screw-secured in the vicinity of the ceiling of the automobile through the mount 3 of the camera platform. The camera 12 is placed within a position that prevents it from contacting the front window 16 approximately in the center portion toward the front side of the automobile, that is, on the right side next to the room mirror 15. In the present invention, the minimum distance between the camera 12 and the front window 16 is set to 35 mm by taking the rotation locus and the movable range of the camera 12 into consideration. Here, the camera 12 can be finely adjusted in its optical axis by the ball shaft 4 within a range with every 7 degrees longitudinally as well as laterally.

FIG. 4 is a plan view that shows the camera and the camera platform. The camera platform according to this embodiment is attached to the hook portion of the sun visor on the right side. Therefore, the room mirror 15 is positioned immediately left side of the camera 12. Upon securing the camera 12 to a left-hand drive automobile, this arrangement makes it possible to prevent the camera from intervening in the driver's viewing field.

When the camera platform having the configuration of this embodiment is secured to the above-mentioned position, the distance between the rotation shaft 2 and the attaching position of the camera 12 is widened by a length corresponding to the arm part 1; therefore, when the camera 12 is rotated centered on the rotation shaft 2 toward the side opposite to the side on which the room mirror 15 is placed, that is, clockwise, the camera 12 is rotated along an arc. However, since the rotation shaft 2 is apart from the room mirror 15, the rear portion of the camera 12 is prevented from coming into contact with the room mirror 15. Therefore, even when, as shown in FIG. 4, the room mirror 15 is positioned on the left side next to the camera 12, it becomes possible to prevent the room mirror 15 from intervening in the rotation of the camera 12.

In the configuration of this embodiment, the position of the screw hole 3-4 through which the mount 3 is attached to the rotation shaft 2 is offset leftward by about 20 mm from the camera center line L toward the advancing direction. In other words, the screw hole 3-4 is formed so as to be offset in the departing direction from the connector 13, with the radius between the rotation shaft 2 and the connector 13 being made longer. For this reason, as shown in FIG. 4, even when the camera 12 is rotated by 180 degrees, the locus, formed by the connector 13 of the camera 12, does not interfere with the arm attachment part 3-1. In other words, the connector 13 of the camera 12, indicated by a solid line in FIG. 4, is positioned on the side portion of the mount 3. In the case where the camera 12 is rotated clockwise by 90 degrees, the connector 13 is allowed to pass below the securing part 3-2, and is not made in contact with the arm attachment part 3-1. Moreover, in the case where the camera 12 is rotated by 180 degrees centered on the rotation shaft 2, the connector 13 is separated from the mount 3. In this manner, the locus of the rotation of the connector 13 is rotation-shifted by 180 degrees on the rear side of the arm attachment part 3-1. For this reason, the cable 17 extending from the connector 13 is prevented from interfering with the arm attachment part 3-1. Consequently, the interference between the mount 3 and the cable 17 is avoided so that the camera 12 can be easily rotated by 180 degrees.

Here, in the present invention, the description has been given of the camera platform; however, not only the camera 12, but also an optional optical device, such as a telescope, can be mounted on the camera base 14.

Moreover, in this embodiment, the description has been given of the configuration that the camera 12 is secured by utilizing the hook of the sun visor on the right side; however, it may be secured by utilizing the hook of the sun visor on the left side. In such a case, a right-to-left symmetric configuration that the connector 13 of the camera 12 is placed with its face up on the rear end on the left side of the upper face of the camera 12, with the screw hole 3-4 of the mount 3 being formed at a position that is offset toward the right side, may be used.

The camera platform according to the present invention makes it possible to carry out image capturing operations in the rear direction by rotating the arm part, without the necessity of rotating the camera main body in the vicinity of the room mirror, and consequently to provide a useful camera platform for attaching a camera to an automobile.

What is claimed is:

1. A camera platform comprising:
    an attachment member comprising a front portion with a front end, a rear portion with a rear end, a first fastening hole in the rear portion for attaching the attachment member to an attachment target, and a second fastening hole in the front portion;
    an arm;
    a rotation part for rotatably attaching one end of the arm to the attachment member through the second fastening hole; and
    a ball shaft attached to an opposite end of the arm;
    wherein the axis of the second fastening hole is offset from a plane containing the axis of the first fastening hole.

2. The camera platform according to claim 1, wherein the arm part has a crank shape having one end bent upward and an opposite end bent downward, and comprises a pair of shells on opposite lateral sides, the pair of shells for being tightened and secured by a tightening mechanism.

3. The camera platform of claim 1, wherein the attachment member is for attaching the arm part next to a room mirror on a ceiling of an automobile.

4. A camera platform comprising:
    an arm for rotating a camera;
    an attachment member comprising a first fastening hole for attaching the arm to an automobile;
    a rotation part for rotatably attaching one end of the arm to the attachment member via a second fastening hole; and
    a ball shaft attached to an opposite end of the arm,
    wherein the axis of the second fastening hole is offset from a plane containing the axis of the first fastening hole.

5. A camera platform system comprising:
    a camera having a front-to-rear centerline plane;
    an arm part;
    an attachment member comprising a first fastening hole for attaching the attachment member to an attachment target and a second fastening hole;
    a rotation part for rotatably attaching one end of the arm part to the attachment member through the second fastening hole; and
    a ball shaft attached to an opposite end of the arm part to adjust a direction of the camera,
    wherein the axis of the fastening hole located in the attachment member for fastening with the rotation part is offset from the camera centerline plane.

6. The camera platform according to claim 5, wherein the camera comprises a connector, and the axis of the fastening hole is offset from a plane extending through a center axis of the connector.

* * * * *